(12) United States Patent
Kim et al.

(10) Patent No.: US 12,197,248 B2
(45) Date of Patent: Jan. 14, 2025

(54) DISPLAY DEVICE

(71) Applicant: Samsung Display Co., LTD., Yongin-si (KR)

(72) Inventors: Teck Soo Kim, Seongnam-si (KR); Jin Taek Park, Uiwang-si (KR); Jong-Won Choo, Seongnam-si (KR); Dong Ho Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 451 days.

(21) Appl. No.: 17/223,521

(22) Filed: Apr. 6, 2021

(65) Prior Publication Data

US 2022/0066511 A1 Mar. 3, 2022

(30) Foreign Application Priority Data

Sep. 3, 2020 (KR) ........................ 10-2020-0112195

(51) Int. Cl.
*G06F 1/16* (2006.01)
*C09D 11/037* (2014.01)
*G02F 1/1333* (2006.01)
*G09F 9/30* (2006.01)
*H04N 5/33* (2023.01)

(52) U.S. Cl.
CPC .......... *G06F 1/1652* (2013.01); *C09D 11/037* (2013.01); *G02F 1/133305* (2013.01); *G06F 1/1686* (2013.01); *G09F 9/301* (2013.01); *H04N 5/33* (2013.01)

(58) Field of Classification Search
CPC ............. C09D 11/037; G02F 1/133305; G02F 1/133311; G02F 1/13338; G02F 1/133388; G02F 1/1335; G02F 1/133512; G02F 1/133514; G02F 2203/11; G08F 2201/501; G08F 2201/58; G06F 1/1652; G09F 9/301; G09F 9/33; G09F 9/35; H01L 23/554;

(Continued)

(56) References Cited

U.S. PATENT DOCUMENTS 8,248,666 B2 * 8/2012 Kenji ...................... A63F 13/00
  358/3.29
9,740,948 B2 8/2017 Yoshida
(Continued)

FOREIGN PATENT DOCUMENTS

KR 10-2008-0022228 3/2008
KR 10-2014-0003046 1/2014
(Continued)

OTHER PUBLICATIONS

Korean Office Action for Korean Patent Application No. 10-2020-0112195, dated Oct. 30, 2024.

*Primary Examiner* — Sanza L. McClendon
(74) *Attorney, Agent, or Firm* — KILE PARK REED & HOUTTEMAN PLLC

(57) ABSTRACT

A display device according to an embodiment includes a substrate, a display element layer disposed on the substrate, and a window disposed on the display element layer. The window includes a display area and a peripheral area, wherein the window includes a base layer, a print layer disposed on a side of the base layer and including an opening, a first ink layer that overlaps the opening and includes an infrared ink, and a second ink layer that overlaps the opening and includes a white ink.

17 Claims, 21 Drawing Sheets

(58) Field of Classification Search
CPC ............. H01L 27/3227; H01L 51/5275; H01L 2223/54426; H04N 5/33
See application file for complete search history.

(56) References Cited

U.S. PATENT DOCUMENTS

| | | |
|---|---|---|
| 10,031,560 B2 | 7/2018 | Han et al. |
| 10,460,147 B2 * | 10/2019 | Yang ..................... G06F 3/042 |
| 2008/0192300 A1 * | 8/2008 | Kenji ..................... H04N 5/33 |
| | | 358/3.29 |
| 2012/0170284 A1 | 7/2012 | Shedletsky |
| 2013/0044337 A1 | 2/2013 | Yoshida |
| 2013/0048837 A1 | 2/2013 | Pope et al. |
| 2018/0355185 A1 | 12/2018 | Gupta et al. |
| 2019/0215974 A1 | 7/2019 | Shim et al. |
| 2020/0031141 A1 | 1/2020 | Yoo et al. |
| 2020/0369560 A1 * | 11/2020 | Takeda ................... B32B 7/025 |

FOREIGN PATENT DOCUMENTS

| | | | |
|---|---|---|---|
| KR | 10-2017-0059539 | 5/2017 | |
| KR | 10-2020-0133288 | 11/2020 | |
| WO | WO-2005051676 A1 * | 6/2005 | ............ B41M 3/148 |

* cited by examiner

DISPLAY DEVICE

CROSS-REFERENCE TO RELATED APPLICATION(S)

This application claims priority to and benefits of Korean Patent Application No. 10-2020-0112195 under 35 U.S.C. § 119, filed on Sep. 3, 2020 in the Korean Intellectual Property Office, the entire contents of which are incorporated herein by reference.

BACKGROUND

1. Technical Field

The disclosure relates to a display device.

2. Description of the Related Art

Current display devices include a liquid crystal display (LCD), an organic light emitting display device (OLED), and the like. These display devices include a display panel that displays an image and a cover window that protects the display panel.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a display device that is manufactured through a simple process and has a window including an infrared ray detection area.

A display device according to an embodiment may include a display element layer disposed on a substrate, and a window disposed on the display element layer, the window including a display area and a peripheral area. The window may include a base layer, a first print layer disposed on a side of the base layer and including an opening, a first ink layer that overlaps the opening and includes an infrared ink, and a second ink layer that overlaps the opening and includes a white ink.

The white ink may include at least one of compounds represented by Chemical Formula 1 to Chemical Formula 4:

[Chemical Formula 1]

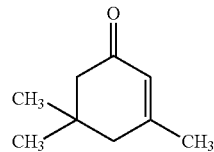

[Chemical Formula 2]

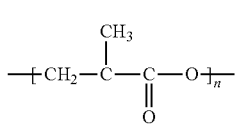

[Chemical Formula 3]

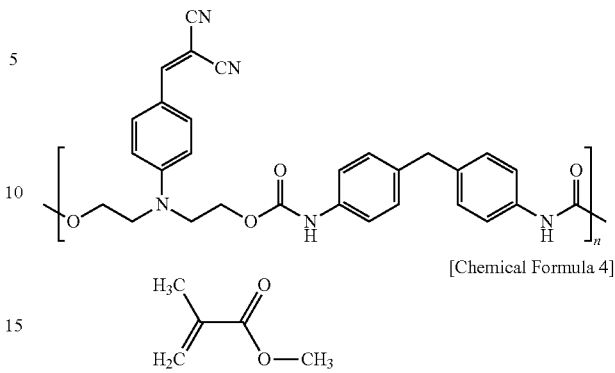

[Chemical Formula 4]

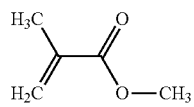

wherein, in Chemical Formula 2 and Chemical Formula 3, n may be a natural number greater than 1.

The compound represented by Chemical Formula 1 may be included in an amount equal to or greater than about 48 wt % with respect to the total content of the white ink, the compound represented by Chemical Formula 2 may be included in an amount equal to or greater than about 44 wt % with respect to the total content of the white ink, the compound represented by Chemical Formula 4 may be included in an amount equal to or greater than about 1 wt % with respect to the total content of the white ink, and the sum of the compounds represented by Chemical Formula 1, Chemical Formula 2, and Chemical Formula 4 may be 100 wt %.

The compound represented by Chemical Formula 1 may be included in an amount equal to or greater than about 48 wt % with respect to the total content of the white ink, the compound represented by Chemical Formula 3 may be included in an amount equal to or greater than about 44 wt % with respect to the total content of the white ink, the compound represented by Chemical Formula 4 may be included in an amount equal to or greater than about 1 wt % with respect to the total content of the white ink, and the sum of the compounds represented by Chemical Formula 1, Chemical Formula 3, and Chemical Formula 4 may be 100 wt %.

The display device may further include an alignment mark that overlaps the peripheral area, wherein the alignment mark may include the white ink.

The alignment mark and the second ink layer may be disposed on a same layer.

The window may further include a second print layer disposed between the first print layer and the second ink layer.

The second print layer may be disposed between the first ink layer and the second ink layer.

The second print layer may be disposed between the first print layer and the first ink layer.

The display device may further include an infrared ray sensor that overlaps the opening.

The opening may overlap the peripheral area.

The opening may overlap the display area.

The opening may have a transmittance equal to or greater than about 40% in a wavelength of 940 nanometers.

A display device according to an embodiment may include a display element layer disposed on a substrate, a window disposed on the display element layer, the window including an infrared ray detection area, and an infrared ray sensor that overlaps the infrared ray detection area. The window may include a base layer, a print layer disposed on a side of the base layer, a first ink layer that overlaps at least a part of the print layer and includes infrared ray ink, the first ink layer while being disposed in the infrared ray detection area, and a second ink layer including a white ink, the second ink layer overlapping the first ink layer.

The print layer may include an opening that overlaps the first ink layer and the second ink layer.

The display device may include a display area and a peripheral area, and an alignment mark that overlaps the peripheral area, and the alignment mark and the second ink layer may include a same white ink.

The print layer may include layers.

According to the embodiments, a display device manufactured through a simple process and including a window including an infrared ray detection area can be provided.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
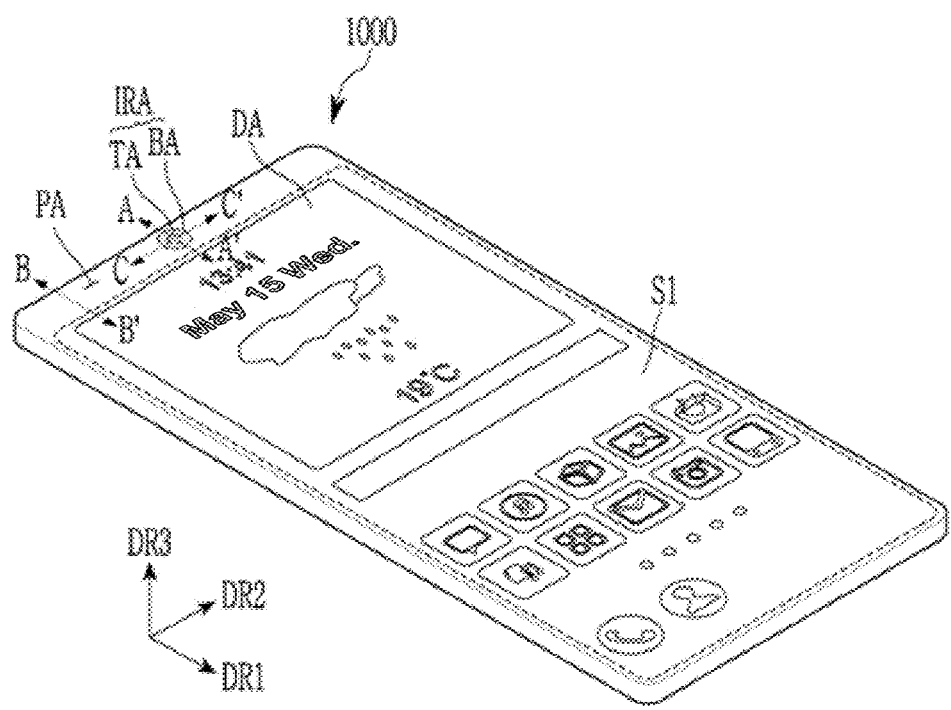
FIG. 1 is a perspective view of a display device according to an embodiment.

The invention will be described more fully hereinafter with reference to the accompanying drawings, in which embodiments of the invention are shown. As those skilled in the art would realize, the described embodiments may be modified in various different ways, all without departing from the spirit or scope of the invention and should not be construed as limited to the embodiments set forth herein. Rather, these embodiments are provided so that this disclosure will be thorough and complete, and will convey the scope of the disclosure to those skilled in the art.

The drawings and description are to be regarded as illustrative in nature and not restrictive. Like reference numerals designate like elements throughout the specification.

In the drawings, size and thickness of each element are arbitrarily illustrated for convenience of description, and the invention is not necessarily limited to as illustrated in the drawings. In the drawings, the thicknesses of layers, films, panels, regions, etc., may be exaggerated for clarity. In the drawings, for better understanding and ease of description, the thicknesses of some layers and regions may be exaggerated.

As used herein, the expressions used in the singular such as "a," "an," and "the" are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

The term "at least one of" is intended to include the meaning of "at least one selected from" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be understood that when an element such as a layer, film, region, or substrate is referred to as being "on," "connected to," or "coupled to" another element, it can be directly on, connected to, or coupled to the other element, or one or more intervening elements may also be present. When an element is referred to as being "directly on", "directly connected to," or "directly coupled to" another element, there are no intervening elements present. Throughout the specification, the word "on" a target element will be understood to be positioned above or below the target element, and will not necessarily be understood to be positioned "at an upper side" based on an opposite to gravity direction.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Throughout the specification, the phrase "in a plan view" means viewing the object from the top, and the phrase "in a schematic cross-sectional view" means viewing a cross-section of which the object is vertically cut from the side.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the embodiments of the inventive concept.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, 10%, or 5% of the stated value.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2A:
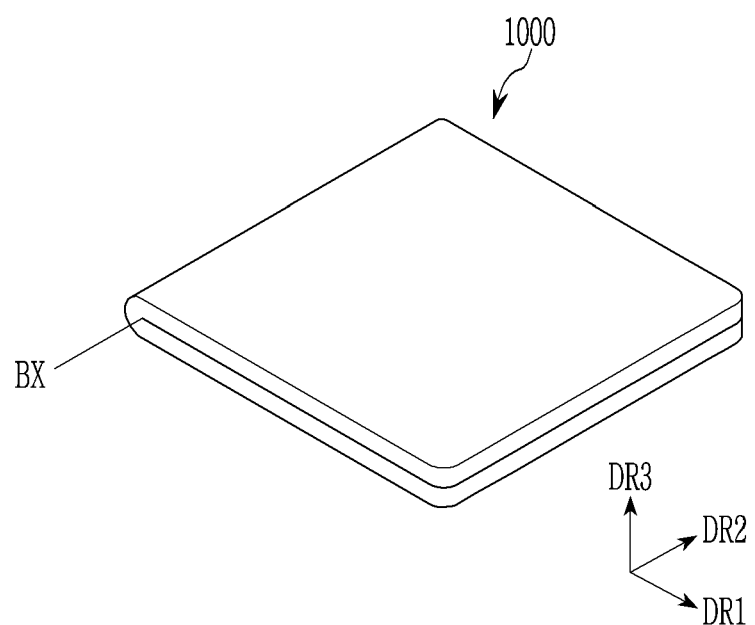
FIGS. 2A, 2B, 2C, 2D, 2E, 2F, and 2G are perspective views respectively illustrating the display device of FIG. 1 in a folding or rolling state.

Hereinafter, a display device according to an embodiment will be described with reference to FIG. 1 to FIG. 3C. FIG. 1 is a perspective view of a display device according to an embodiment, FIGS. 2A, 2B, 2C, 2D, 2E, 2F, and 2G are perspective views respectively illustrating the display device of FIG. 1 in a folded or rolled state, and FIG. 3A, FIG. 3B, and FIG. 3C are schematic plan views of an infrared ray detection area of a window included in the display device.

Referring to FIG. 1, a display device 1000 according to an embodiment may include a display area DA of which one side S1 displays an image, and a peripheral area PA that surrounds the display area DA. The peripheral area PA may be an area where an image is not displayed, and the shape of the display area DA and the shape of the peripheral area PA may be relatively changed. Depending on embodiments, the peripheral area PA may be substantially omitted. In the specification, icons and a clock window of an application are illustrated in FIG. 1, and the display area DA may be disposed in the shape of a quadrangle. In the specification, the display device 1000 includes the display area DA and the peripheral area PA, and they may be substantially the same as a display area and a peripheral area of a window, which will be described later.

The peripheral area PA according to the embodiment may include an infrared ray detection area IRA. The infrared ray detection area IRA may include a blocking area BA and a transmissive area TA. The blocking area BA is an area where an optical signal is blocked, and the transmissive area TA is an area where an optical signal can be transmitted.

When the infrared ray detection area IRA is located in the peripheral area PA, the blocking area BA is not separated from the peripheral area PA but can be divided into one area, and only the transmissive area TA can be identified.

The display device 1000 according to the embodiment may be a foldable or rollable display device, a bendable display device, or a stretchable display device. The display device 1000 according to the embodiment may be used not only for large electronic devices such as televisions and monitors, but also for small electronic devices such as portable phones, tablets, car navigation systems, game devices, and smart watches.

Hereinafter, referring to FIG. 1 to FIG. 2A, the display device 1000 according to the embodiment may be in-folded with reference to a bending axis BX that is parallel with a second direction DR2.

As the display device 1000 according to the embodiment is in-folded with reference to the bending axis BX, the first side S1 of the display device 1000 is folded with reference to the bending axis BX that is parallel with the second direction DR2 such that the first side S1 of the display device 1000 divided with reference to the bending axis BX is folded so the divided parts face each other, and a rear side that opposes the first side S1 may be exposed to the outside.

Figure 2B:
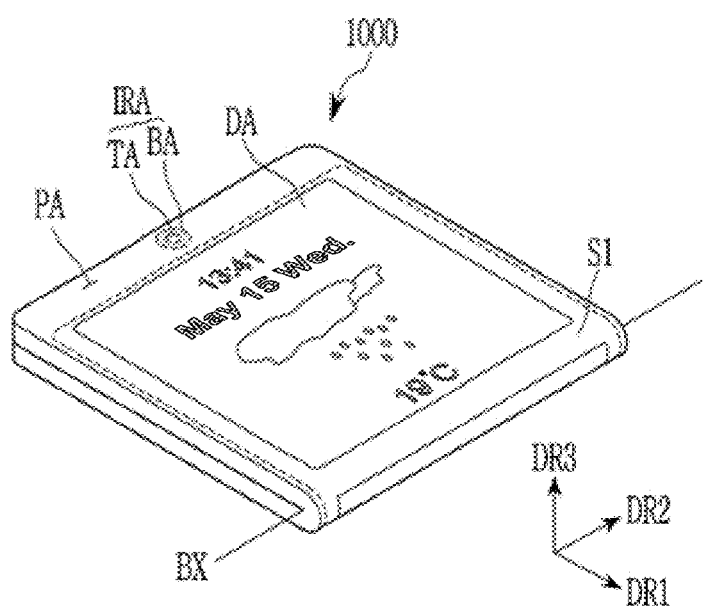
Figure 3A:
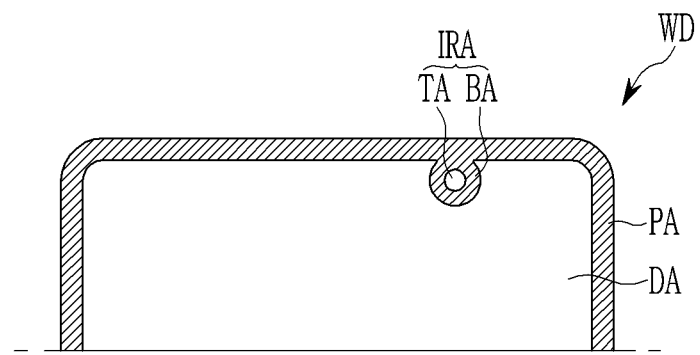
FIG. 3A, FIG. 3B, and FIG. 3C are schematic plan views of an infrared ray detection area of a window included in the display device.
Figure 3B:
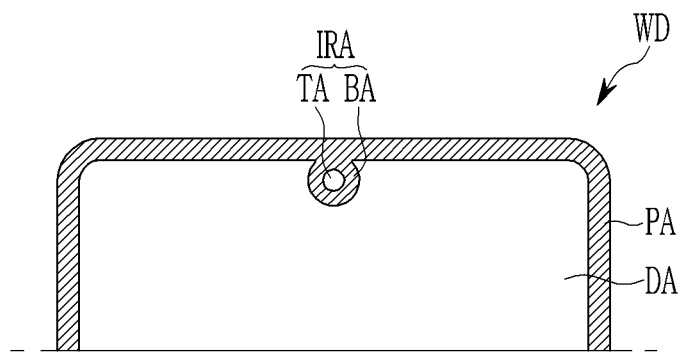
Figure 3C:
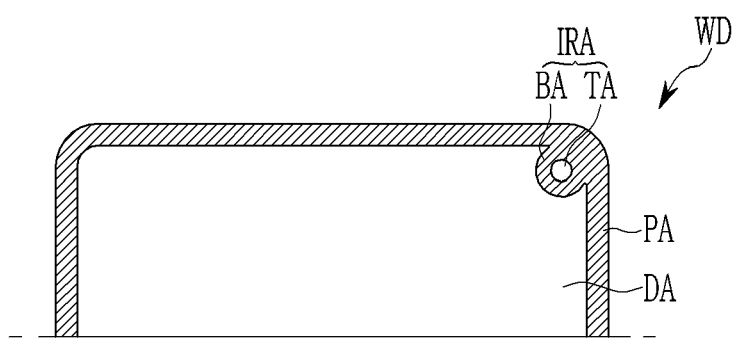

Referring to FIG. 2B, the display device 1000 according to the embodiment may be out-folded with reference to the bending axis BX that is parallel with the second direction DR2. As the display device 1000 according to the embodiment is out-folded with reference to the bending axis BX that is parallel with the second direction DR2, the first side S1 of the display device 1000 is exposed to the outside, a rear side that opposes the first side S1 is folded with reference to the bending axis BX that is parallel with the second direction DR2 such that opposite sides of the rear side, divided with reference to the bending axis BX, may be folded to face each other.

Figure 2C:
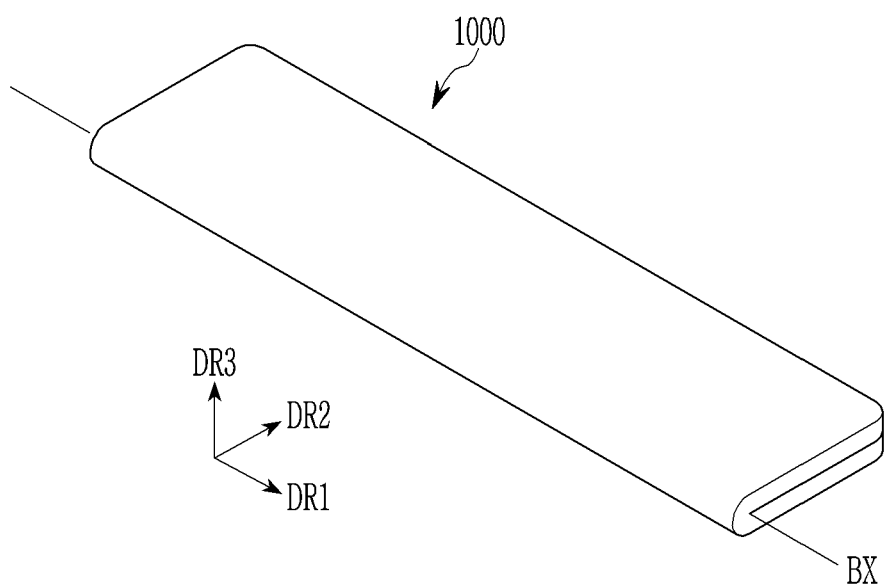

Referring to FIG. 2C in addition to FIG. 1, the display device 1000 according to the embodiment may be in-folded with reference to the bending axis BX that is parallel with the first direction DR1. As the display device 1000 according to the embodiment is in-folded with reference to the bending axis BX that is parallel with the first direction DR1, the first side S1 of the display device 1000 is folded so divided parts face each other and the rear side that opposes the first side S1 may be exposed to the outside.

Figure 2D:
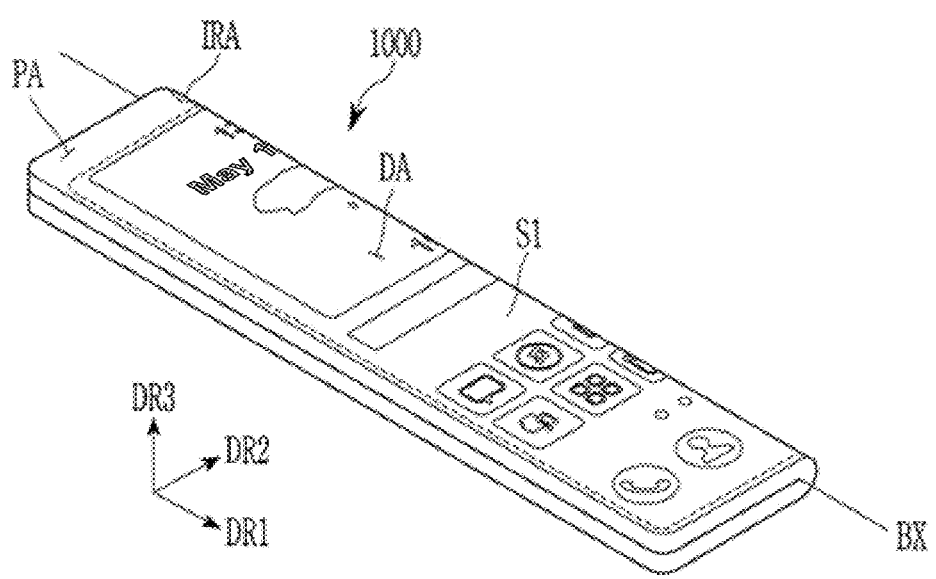

Referring to FIG. 2D, the display device 1000 according to the embodiment may be out-folded with reference to the bending axis BX that is parallel with the first direction DR1. As the display device 1000 according to the embodiment is out-folded with reference to the bending axis BX that is parallel with the first direction DR1, the first side S1 of the display device 1000 is exposed to the outside, and the rear side that opposes the first side S1 is folded with reference to the bending axis BX that is parallel with the first direction DR1 such that opposite sides of the rear side, divided with reference to the bending axis BX, face each other.

Figure 2E:
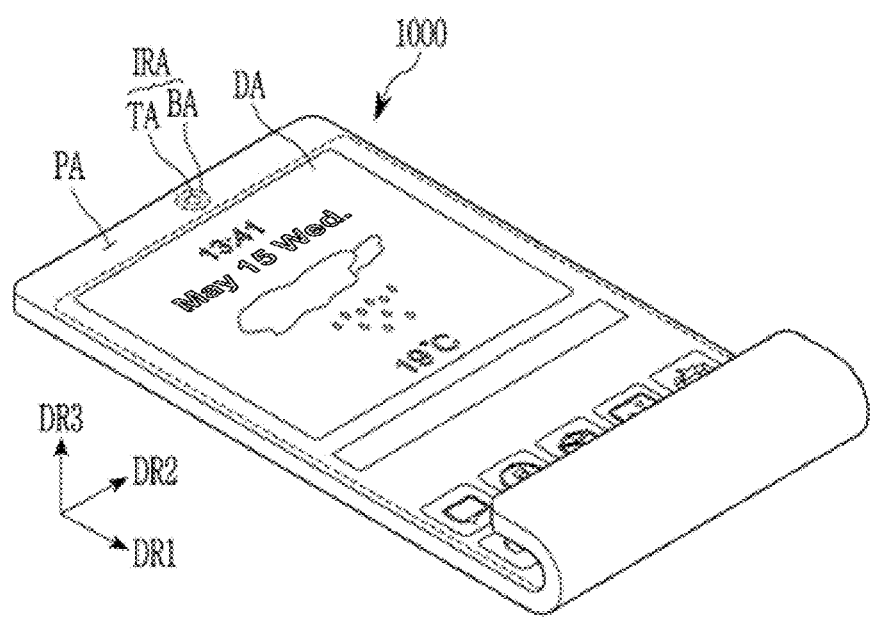
Figure 2F:
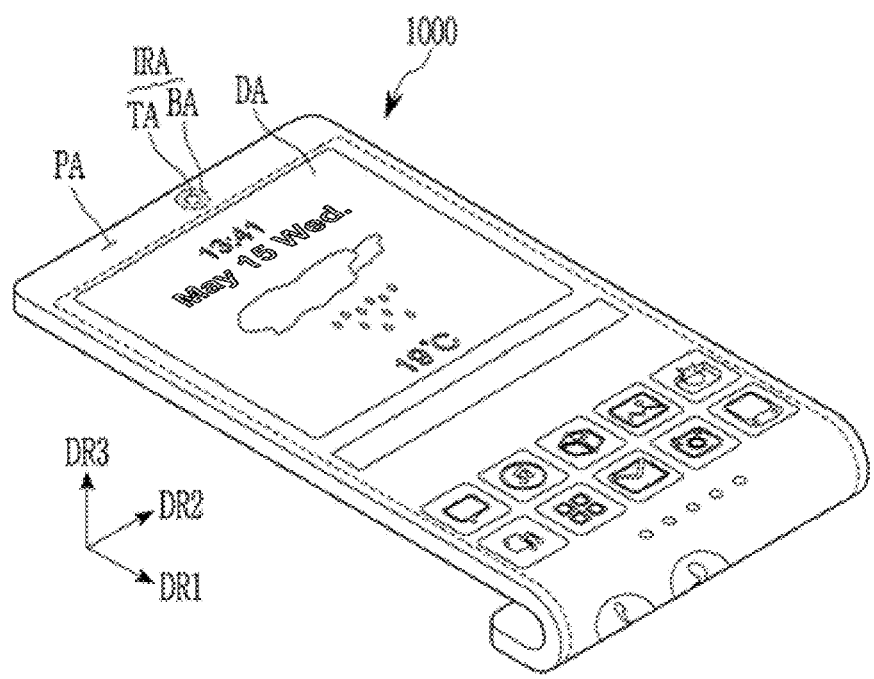
Figure 2G:
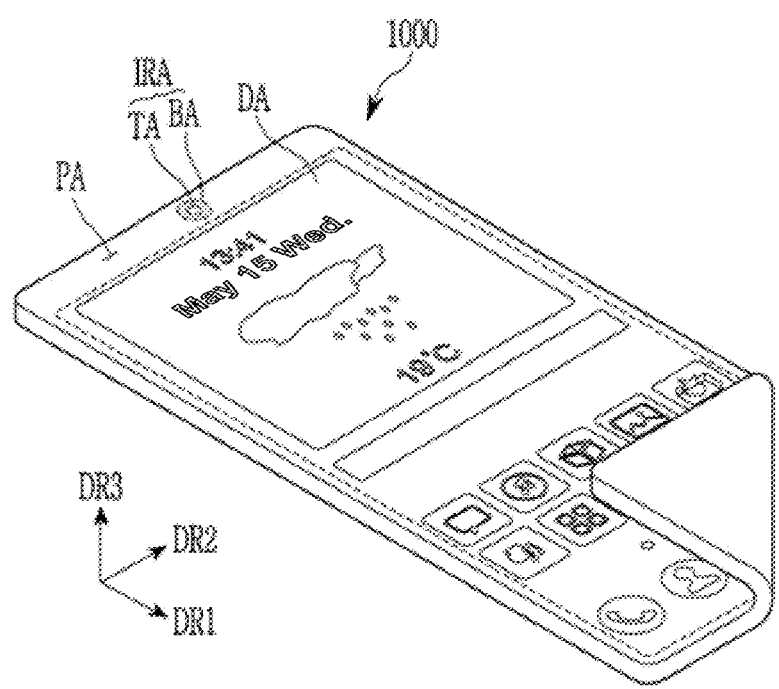

Referring to FIG. 2E to FIG. 2G, the display device 1000 according to the embodiment can be folded or rolled in various manners. As shown in FIG. 2E, the display device 1000 according to the embodiment may be rolled or folded inward from the end. In another embodiment, as shown in FIG. 2F, the display device 1000 according to the embodiment may be rolled or folded outward from the end. In yet another embodiment, as shown in FIG. 2G, the display device 1000 according to the embodiment may be folded or rolled in a diagonal direction. FIG. 2A to FIG. 2G illustrate rolling or folding manners of the display device 1000, and the display device 1000 may be folded or folded in various manners other than the illustrated manners.

Referring to FIG. 3A to FIG. 3C in addition to FIG. 1, as described with reference to FIG. 1, the window WD includes the transparent display area and the opaque peripheral area PA such that a non-display area and a display area of the display device can be divided. The infrared ray detection area IRA according to the embodiment may be located in the peripheral area PA. The infrared ray detection area IRA may be disposed at a center of the peripheral area PA as shown in FIG. 1, but it may be provided in the form of a protrusion from an edge of the peripheral area PA as shown in FIG. 3A to FIG. 3C.

FIG. 3A shows alignment of the infrared ray detection area IRA leaned to one side from an imaginary line crossing the center of the display device. As shown in FIG. 3B, the infrared ray detection area IRA may be disposed at an upper center of the display device such that it may overlap the imaginary line that crosses the center of the display device. As shown in FIG. 3C, the infrared ray detection area IRA may be disposed at an upper right corner of the display device. However, the invention is not limited thereto, and the infrared ray detection area IRA can be disposed in various positions without limitation in various plane types.

Figure 4:
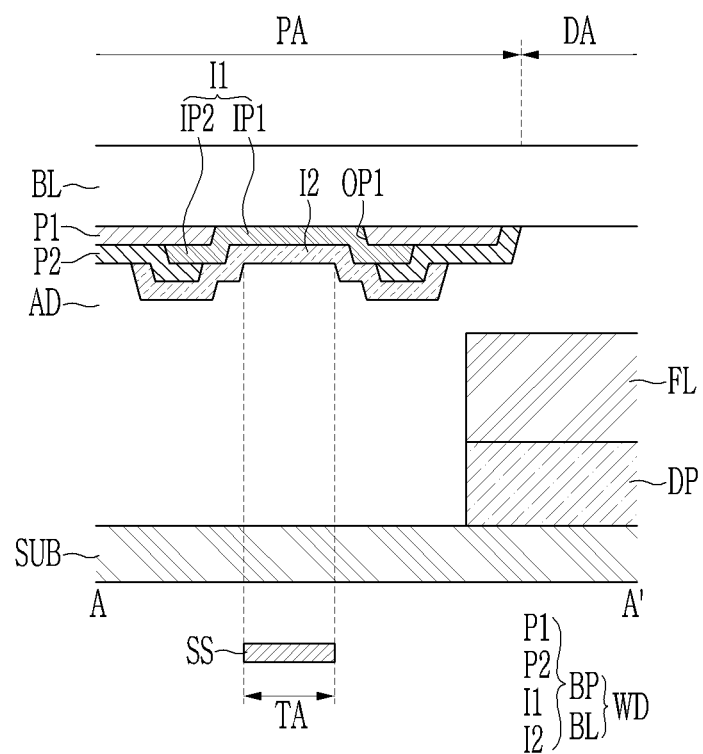
FIG. 4 is a schematic cross-sectional view of FIG. 1, taken along the line A-A' according to the embodiment.
Figure 5:
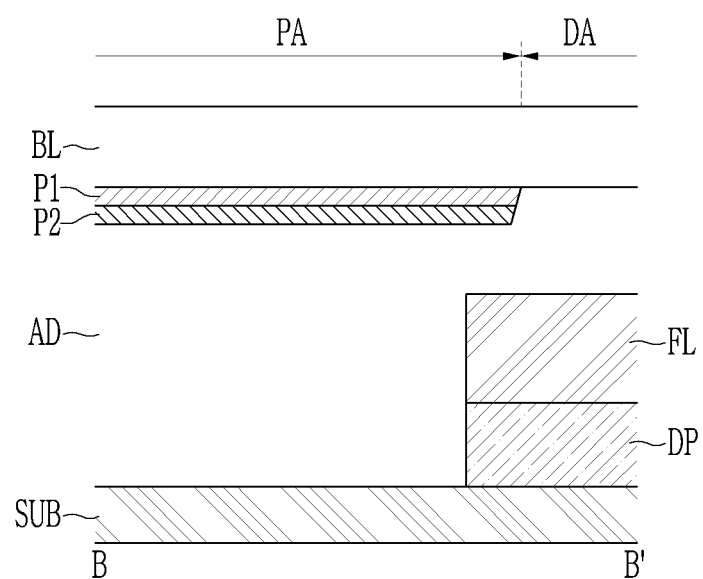
FIG. 5 is a schematic cross-sectional view of FIG. 1, taken along the line B-B' according to the embodiment.

Hereinafter, the display device according to the embodiment will be described with reference to FIG. 4 and FIG. 5. FIG. 4 is a schematic cross-sectional view of FIG. 1, taken along the line A-A' according to the embodiment, and FIG. 5 is a schematic cross-sectional view of FIG. 1, taken along the line B-B' according to the embodiment.

The display device according to the embodiment may include a display element layer DP that is disposed on a substrate SUB, a functional layer FL that is disposed on the display element layer DP, and a window WD that is disposed on the functional layer FL.

The display element layer DP overlaps the display area DA, and generates an image. The display element layer DP is not particularly limited, and for example, may include a light emitting display panel or a liquid crystal panel.

The functional layer FL overlaps the display area DA, and may include various members for improvement of functions of the display device. The functional layer FL may detect an external input and/or an external pressure of the display device according to the configuration.

The functional layer FL according to the embodiment may include an optical film and an input detection sensor. The optical film may lower reflectance of external light. The optical film may include a polarization layer and a phase delay layer. The input detection sensor may detect an external input of a user. The input detection sensor may detect an external input by a capacitance method, a pressure sensing method, or an electron induction method.

The display device may include an adhesive layer (not shown) positioned between the display element layer DP and the functional layer FL, and may include an adhesive layer AD (not shown) positioned between the functional layer FL and the window WD.

Hereinafter, the window WD will be described in detail.

The window WD according to the embodiment includes a base layer BL and a bezel pattern BP.

The base layer BL according to the embodiment may include a plastic material. The base layer BL may include a polymeric compound. For example, the base layer BL may include one or more of polyacrylate, polyethylene ether phthalate, polyethylene naphthalate, polycarbonate, polyarylate, polyetherimide, polyether sulfone, polymethyl methacrylate, tricellulose acetate, polyvinylidene chloride, polyvinylidene fluoride, and ethylene-vinyl alcohol copolymer, or a combination thereof. However, this is not restrictive, and the base layer BL may include a glass substrate and the like.

Although it is not illustrated in the specification, a hard coating layer or a functional layer that is disposed on an upper surface of the base layer BL may be further included.

The bezel pattern BP may be disposed between the base layer BL and the adhesive layer AD. An area where the bezel pattern BP is disposed corresponds the peripheral area PA of FIG. 1 and FIG. 3A to FIG. 3C, and an area where the bezel pattern BP is not disposed corresponds to the display area DA of FIG. 1 and FIG. 3A to FIG. 3C.

The bezel pattern BP includes a first print layer P1, a second print layer P2, a first ink layer I1, and a second ink layer I2 that are disposed on one side of the base layer BL. The bezel pattern BP may have a shape that corresponds to the peripheral area PA of FIG. 1 and the peripheral area PA of FIG. 3A to FIG. 3C.

The first print layer P1 may be disposed on a side (i.e., a rear side) of the base layer BL, facing an adhesive layer AD. As shown in FIG. 1, the first print layer P1 may overlap the peripheral area PA of the display device on a plane.

The first print layer P1 may be a color layer representing color, or a light block layer representing black. The color layer and the light block layer may be formed through deposition, printing, and/or coating processes.

The first print layer P1 may include an opening OP1. The opening OP1 may overlap an infrared ray sensor SS that is disposed at a lower end of the substrate SUB. The opening OP1 may overlap the transmissive area PA described with reference to FIG. 1 and FIG. 3A to FIG. 3C. An area where the first print layer P1 that is adjacent to where the opening OP1 is located may correspond to the blocking area BA described with reference to FIG. 1 and FIG. 3A to FIG. 3C, and may be connected as a single area rather than being divided from the peripheral area PA.

The first ink layer I1 may be disposed on the first print layer P1 and the base layer BL. The first ink layer I1 may overlap the opening OP1 of the first print layer P1, and an end of the first ink layer I1 may be disposed on the first print layer P1.

The first ink layer I1 may include infrared ink. The infrared ink may include at least one of a base resin and a pigment or dye dispersed in the base resin. Since the first ink layer I1 contains a pigment or dye, it may represent a specific color. Accordingly, the sensor SS received in the display device may not be visually recognized from the outside.

The first ink layer I1 may transmit infrared rays. The first ink layer I1 may selectively transmit only infrared rays among infrared rays and visible rays. The first ink layer I1 may absorb visible light and transmit infrared light. For example, the first ink layer I1 may absorb 90% or more of visible light and transmit 80% or more of infrared light. For example, the first ink layer I1 may transmit 90% or more of infrared light. The first ink layer I1 may have a transmittance in a range of about 7.0% to about 13.0% for a 550 nanometer wavelength and a transmittance of equal to or greater than about 85% for a 940 nanometer wavelength.

Infrared rays emitted from the infrared ray sensor SS are emitted to the outside through the first ink layer IL and infrared rays reflected by an external material may reach the infrared ray sensor SS through the first ink layer I1. Since the visible light is mostly absorbed by the first ink layer IL the sensitivity of the infrared ray sensor SS can be improved.

At least one of the base resin, dye, or pigment included in the first ink layer I1 can absorb visible light and transmit infrared light.

The first ink layer I1 may include a first portion IP1 disposed in the opening of the first print layer P1 and a second portion IP2 disposed on the first print layer P1. The second portion IP2 may extend from the first portion IP1, and the second portion IP2 and the first portion IP1 may be integrally formed with each other.

A second print layer P2 is disposed on the first print layer P1 and the first ink layer I1. The second print layer P2 may have a planar shape substantially equivalent to that of the first print layer P1. The second print layer P2 may have a shape that overlaps the peripheral area PA.

The second print layer P2 may include a same material as the first print layer P1, or may include a different material. The second print layer P2 may be a color layer representing color or a light block layer representing black. The color layer and the light block layer may be formed through deposition, print, and/or coating processes.

An end of the second print layer P2 may be disposed on the first ink layer I1. The remaining areas of the second print layer P2 are disposed on the first print layer P1 and may contact the first print layer P1. When the first print layer P1 and the second print layer P2 are formed of a same material, the first print layer P1 and the second print layer P2 may form one layer.

The second ink layer I2 may be disposed on the second print layer P2 and the first ink layer I1. The second ink layer I2 overlaps the opening OP1 of the first print layer P1, and may wholly cover the exposed first ink layer I1. The second ink layer I2 may prevent damage due to exposure of the first ink layer I1 to moisture or outside air.

The second ink layer I2 may extend to overlap the second print layer P2. The second ink layer I2 may contact one side of the second print layer P2 while overlapping an end of the second print layer P2.

The second ink layer I2 according to an embodiment may include white ink. The white ink may contain at least one of the compounds represented by Chemical Formula 1 to Chemical Formula 4. White ink included in the second ink layer I2 according to the embodiment may include compounds represented by Chemical Formula 1, Chemical Formula 2, and Chemical Formula 4, or may contain compounds represented by Chemical Formula 1, Chemical Formula 3, and Chemical Formula 4.

[Chemical Formula 1]

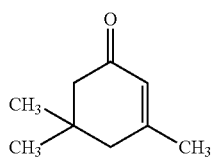

[Chemical Formula 2]

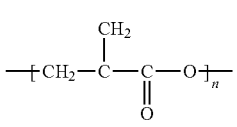

[Chemical Formula 3]

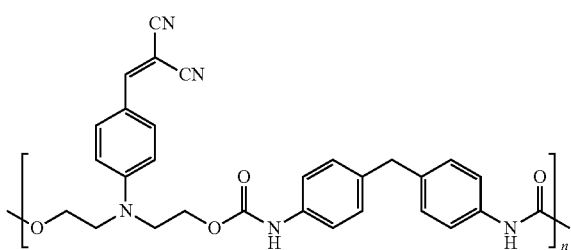

[Chemical Formula 4]

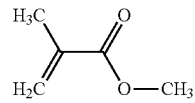

In Chemical Formula 2 and Chemical Formula 3, n may be a natural number of 1 or more.

The compound represented by Chemical Formula 1 may be included in an amount equal to or greater than 48 wt % with respect to the total content of white ink to form the second ink layer I2. The compound represented by Chemical Formula 2 may be included in an amount equal to or greater than 44 wt % with respect to the total content of white ink to form the second ink layer I2. The compound represented by Chemical Formula 3 may be included in an amount equal to or greater than 44 wt % with respect to the total content of white ink to form the second ink layer I2. The compound represented by Chemical Formula 4 may be included in an amount equal to or greater than 1 wt % with respect to the total content of white ink to form the second ink layer I2. White ink for forming the second ink layer I2 may include the compounds represented by Chemical Formula 1, Chemical Formula 2, and Chemical Formula 4 where the total content does not exceed 100 wt %, or the compounds represented by Chemical Formula 1, Chemical Formula 3, and Chemical Formula 4 in a range where the total content does not exceed 100 wt %.

The second ink layer I2 may have a transmittance in a range of about 7.1% to about 9.2% at 550 nanometers, and may have a transmittance equal to or greater than about 47% at a wavelength of 940 nanometers. A thickness of the second ink layer I2 may be equal to or less than about 10 micrometers. When the thickness is thicker than the above-stated numerical range, it may be difficult to achieve the aforementioned transmittance.

According to the embodiment, the first ink layer I1 and the second ink layer I2 may be disposed in the opening OP1 that overlaps the infrared ray sensor SS. For example, the first ink layer I1 and the second ink layer I2 may be disposed in the transmissive area TA. The opening OP1 overlapping the first ink layer I1 and the second ink layer I2 may have a transmittance in a range of about 0.5% to about 1.2% at a wavelength of 550 nanometers and a transmittance equal to or greater than about 40% at a wavelength of 940 nanometers.

The remaining peripheral area PA that does not overlap the infrared ray sensor SS may include the first print layer P1 and the second print layer P2 disposed between the base layer BL and the adhesive layer AD as shown in FIG. 5.

Figure 6:
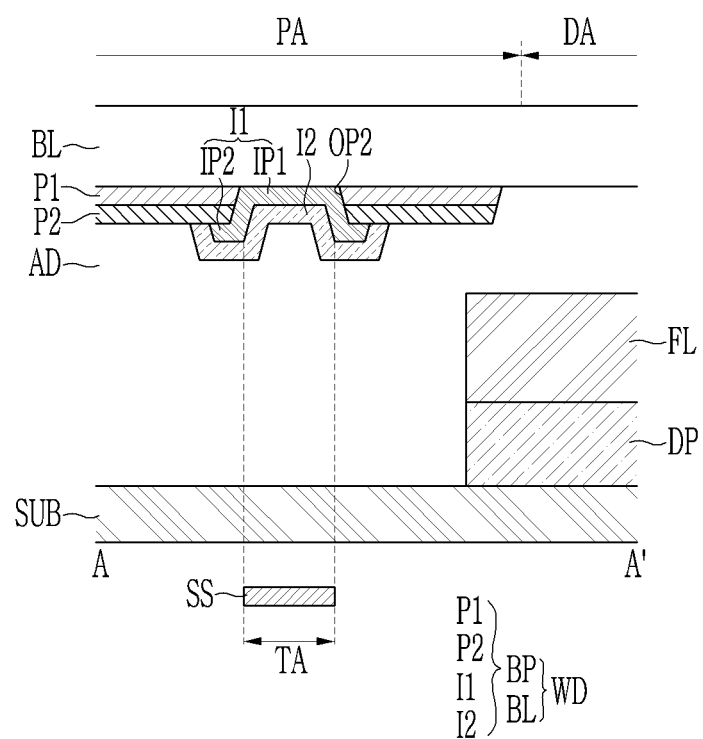
FIG. 6 is a schematic cross-sectional view of FIG. 1, taken along the line A-A' according to an embodiment.

Hereinafter, a peripheral area of a display device according to an embodiment will be described with reference to FIG. 6. FIG. 6 is a schematic cross-sectional view of FIG. 1, taken along the line A-A' according to an embodiment. A description of the constituent element that is the same as or similar to the above-described constituent element will be omitted.

A window WD according to the embodiment may include a base layer BL and a bezel pattern BP. The bezel pattern BP may include print layers P1 and P2 and ink layers I1 and I2 that are disposed on a rear side of the base layer BL.

According to the embodiment, a first print layer P1 and a second print layer P2 may be sequentially stacked on a rear side of the base layer BL. A first ink layer I1 may be disposed in an opening OP2 of the first print layer P1 and the second print layer P2.

The first ink layer I1 may include a first portion IP1 that fills the opening OP2, and a second portion IP2 that extends to the top surface of the second print layer P2 while overlapping side surfaces of the first print layer P1 and the second print layer P2.

The second ink layer I2 may be disposed on the first ink layer I1. The second ink layer I2 may wholly cover the first ink layer I1 while overlapping the opening OP2. The second ink layer I2 may prevent damage to the first ink layer I1 by exposure to outside air or moisture. The second ink layer I2 may be disposed on a side of the second print layer P2, and may contact a side of the second print layer P2 while covering a side surface of the first ink layer I1.

Figure 7:
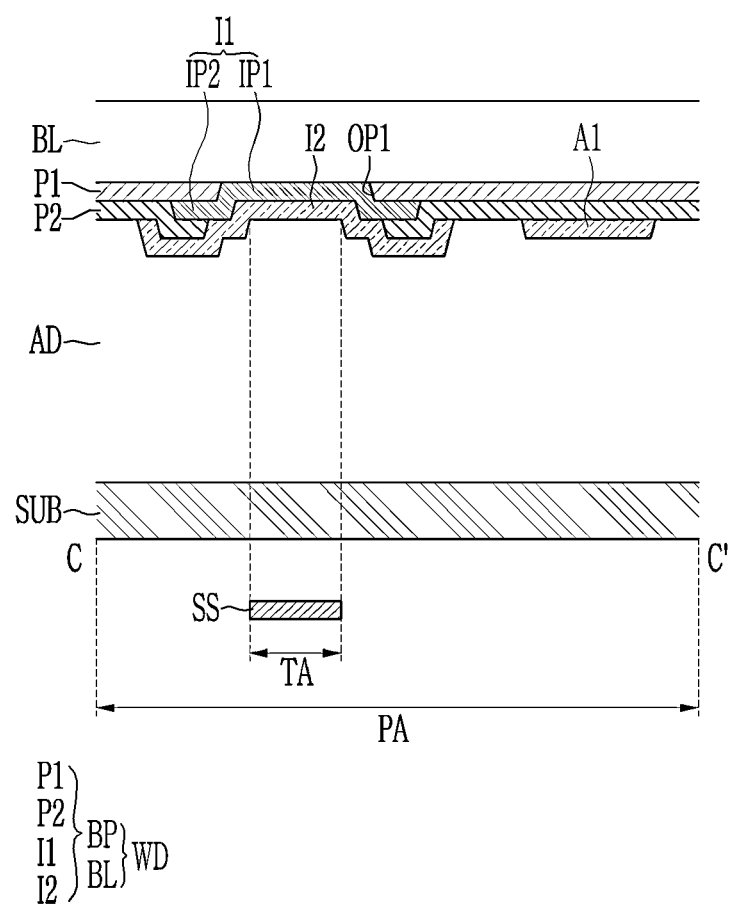
FIG. 7 is a schematic cross-sectional view of FIG. 1, taken along the line C-C' respectively according to embodiment.
Figure 8:
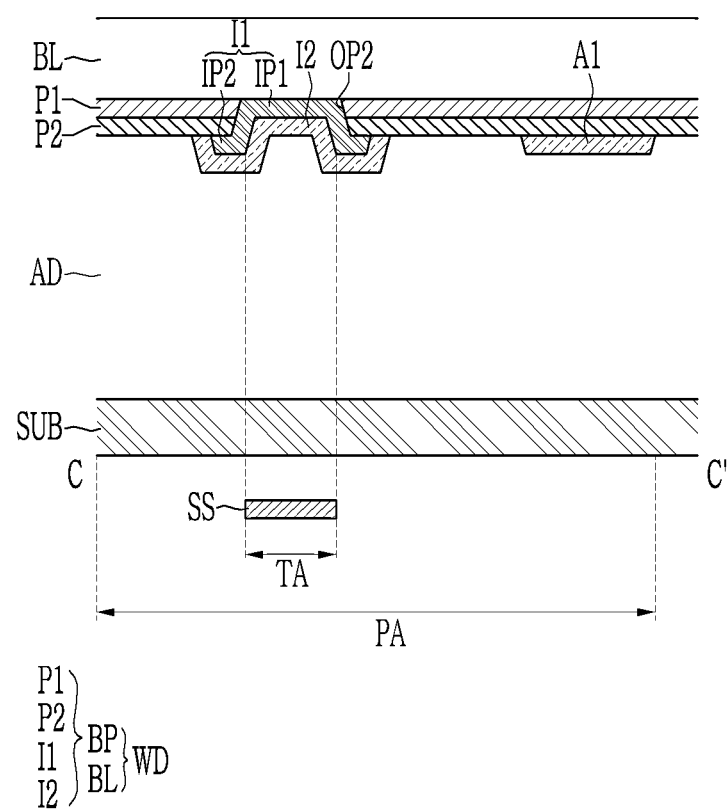
FIG. 8 is a cross-sectional view of FIG. 1, taken along the line C-C' respectively according to embodiment.

Hereinafter, a peripheral area of a display device according to an embodiment will be described with reference to FIG. 7 and FIG. 8. FIG. 7 and FIG. 8 are schematic cross-sectional views of FIG. 1, taken along the line C-C' respectively according to embodiments.

Referring to FIG. 7, a window WD according to an embodiment includes a first print layer P1 that is disposed on a side of a base layer BL and includes an opening OP1. The first print layer P1 may have a shape that overlaps a peripheral area PA of the window WD.

A first ink layer I1 may be disposed on the base layer BL and the first print layer P1. The first ink layer I1 may overlap the opening OP1, and may contact the base layer BL in an area overlapping the opening OP1.

A second print layer P2 may be disposed on the first ink layer I1 and the first print layer P1. The second print layer P2 may have a planar shape substantially equivalent to that of the first print layer P1. The second print layer P2 may overlap at least a part of an end of the first ink layer I1. The second print layer P2 may also have an opening OP1.

A second ink layer I2 may be disposed on the second print layer P2 and the first ink layer I1. An alignment mark A1 may be disposed on the second print layer P2 of the peripheral area PA. The alignment mark A1 and the second ink layer I2 may be formed of a same material in a same process, and may be disposed on a same layer.

The second ink layer I2 may overlap the opening OP1. The second ink layer I2 extends from an area overlapping the opening OP1, and may overlap the second print layer P2 while covering the first ink layer I1. The second ink layer I2 may cover at least at part of an upper surface of the second print layer P2.

The alignment mark A1 may be aligned on the second print layer P2 that is disposed in the peripheral area PA. The alignment mark A1 may be spaced apart from the second ink layer I2. The alignment mark A1 may include white ink.

The alignment mark A1 may be used for alignment between constituent elements of a display device during a manufacturing process, or may display specific information such as a manufacturing date and a model name of the display device. Since the alignment mark A1 is disposed on the peripheral area PA, it is not exposed to the user.

According to the embodiment, the alignment mark A1 and the second ink layer I2 are formed through a same process, and thus a manufacturing process can be simplified.

Referring to FIG. 8, according to an embodiment, a first print layer P1 and a second print layer P2 may be sequentially stacked on a rear side of a base layer BL. The first print layer P1 and the second print layer P2 may include edges aligned with each other.

The first ink layer I1 may be disposed on an opening OP2 of the first print layer P1 and the second print layer P2. The first ink layer I1 may include a first portion IP1 that fills the opening OP2, and a second portion IP2 that extends to the top surface of the second print layer P2 while overlapping side surfaces of the first print layer P1 and the second print layer P2.

The second ink layer I2 may be disposed on the first ink layer I1. The second ink layer I2 may wholly cover the first ink layer I1 while overlapping the opening OP2. The second ink layer I2 may be disposed on a side of the second print layer P2, and may contact a side of the second print layer P2 while covering a side surface of the first ink layer I1.

An alignment mark A1 may be disposed on the second print layer P2 disposed in the peripheral area PA. The alignment mark A1 may be spaced apart from the second ink layer I2. The alignment mark A1 may be manufactured through a same process as the second ink layer I2, may include a same material, and may be disposed on a same layer. The alignment mark A1 may include white ink.

The alignment mark A1 may be used for alignment between constituent elements of a display device during a manufacturing process, or may display specific information such as a manufacturing date and a model name of the display device.

Figure 9:
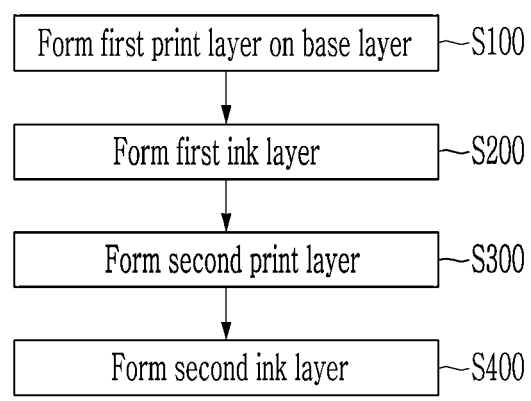
FIG. 9 and FIG. 10 are flowcharts of manufacturing processes of windows according to embodiments, respectively.
Figure 10:
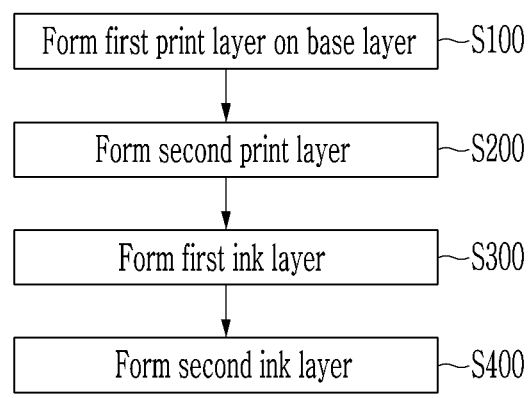

Hereinafter, a manufacturing method of a window according to an embodiment will be described with reference to FIG. 9 and FIG. 10. FIG. 9 and FIG. 10 are flowcharts of manufacturing processes of windows according to embodiments, respectively.

Referring to FIG. 9 in addition to the above-described FIG. 4 and FIG. 5, the first print layer P1 may be formed on the base layer BL (S100). The first print layer P1 may be formed to include the opening OP1 overlapping the infrared ray sensor SS.

The first ink layer I1 may be formed on the first print layer P1 (S200). The first ink layer I1 may be formed to be located on one side of the first print layer P1 while overlapping the opening OP1 of the first print layer P1.

The second print layer P2 is formed on the first ink layer I1 and the first print layer P1 (S300). The second print layer P2 may be formed to include the opening OP1 substantially equivalent to the first print layer P1. A part of an end of the second print layer P2 may overlap a part of an end of the first ink layer I1.

The second ink layer I2 is formed on the first ink layer I1 and the second print layer P2 (S400). The second ink layer I2 overlaps the opening OP1, and may cover the exposed first ink layer I1. As shown in FIG. 7, the alignment mark A1 may be simultaneously formed with the second ink layer I2 in S400.

Referring to FIG. 10 in addition to the above-described FIG. 6, the first print layer P1 may be formed on the base layer BL (S100). The first print layer P1 may be formed to include an opening OP2 that overlaps the infrared ray sensor SS.

The second print layer P2 is formed on the first print layer P1 (S200). The second print layer P2 may be formed to include an opening substantially equivalent to that of the first print layer P1.

The first ink layer I1 may be formed on the second print layer P2 (S300). The first ink layer I1 may be formed to be disposed on one side of the second print layer P2 while overlapping the opening OP2 of the first print layer P1 and the second print layer P2.

The second ink layer I2 is formed on the first ink layer I1 and the second print layer P2 (S400). The second ink layer I2 overlaps the opening OP2, and may completely cover the exposed first ink layer I1. As shown in FIG. 8, the alignment mark A1 and the second ink layer I2 may be simultaneously formed in S400.

Figure 11:
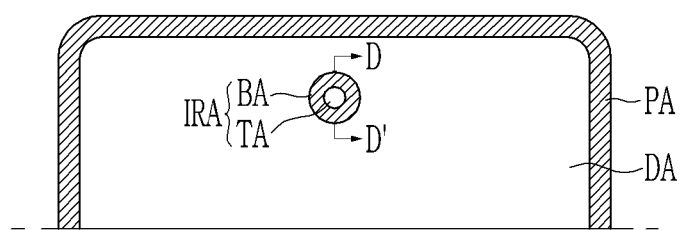
FIG. 11 is a schematic plan view of a display device according to an embodiment.
Figure 12:
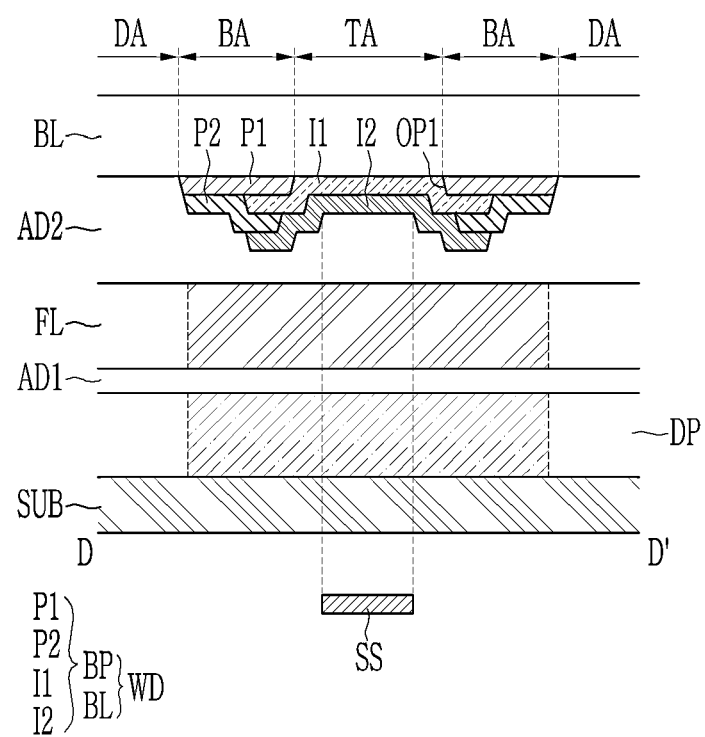
FIG. 12 is a schematic cross-sectional view of FIG. 11, taken along the line D-D' according to an embodiment.
Figure 13:
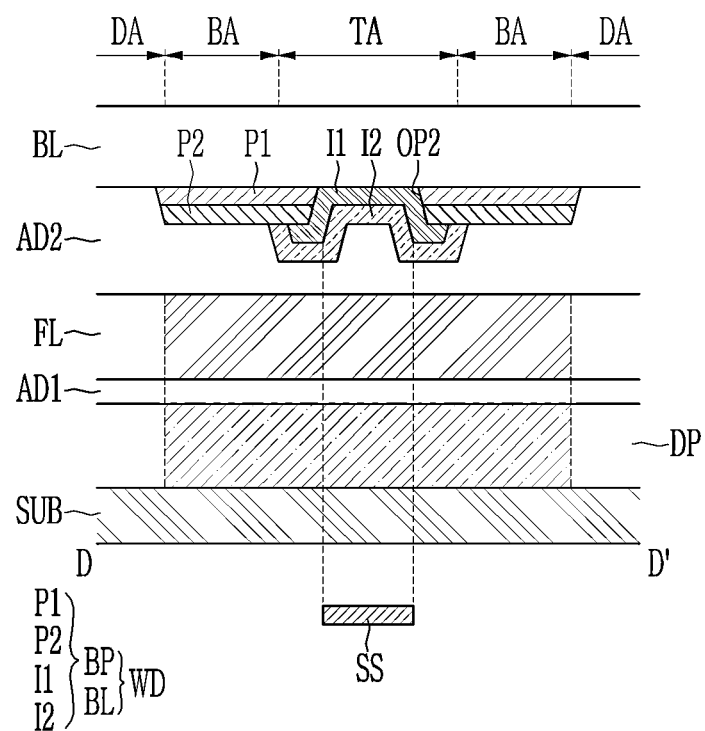
FIG. 13 is a schematic cross-sectional view of FIG. 11, taken along the line D-D' according to an embodiment.

Hereinafter, a display device according to an embodiment will be described with reference to FIG. 11 to FIG. 13. FIG. 11 is a schematic plan view of a display device according to an embodiment, FIG. 12 is a schematic cross-sectional view of FIG. 11, taken along the line D-D' according to an embodiment, and FIG. 13 is a schematic cross-sectional view of FIG. 11, taken along the line D-D' according to an embodiment. A description of the constituent elements that are the same as the above-described constituent elements will be omitted.

Referring to FIG. 11, a display device according to an embodiment may include an infrared ray detection area IRA disposed in a display area DA. The infrared ray detection area IRA may include a transmissive area TA that transmits an optical signal and a blocking area BA that blocks the optical signal.

Referring to FIG. 12 in addition to FIG. 11, a display element layer DP, a functional layer FL, and a window WD may be disposed on a substrate SUB in the display area DA. An adhesive layer AD1 may be disposed between the display element layer DP and the functional layer FL, and an adhesive layer AD2 may be disposed between the functional layer FL and the window WD.

According to the embodiment, the functional layer FL and the display element layer DP overlapping the infrared ray detection area IRA may have an opaque configuration removed or only a substantially transparent configuration may remain.

A first print layer P1, a second print layer P2, a first ink layer IL and a second ink layer I2 may be disposed in the window WD that is disposed in the blocking area BA, and a first ink layer I1 and a second ink layer I2 may be disposed in the window WD that is disposed in the transmissive area TA. The first print layer P1 and the second print layer P2 are not disposed in the transmissive area TA, and the first ink layer I1 and the second ink layer I2 may overlap the opening OP1 of the print layers P1 and P2.

Referring to the stacking order, the first print layer P1 according to the embodiment overlaps the blocking area BA of the infrared ray detection area IRA. The first print layer P1 may include an opening OP1 overlapping the transmissive area TA.

The first ink layer I1 disposed on the first print layer P1 may overlap the transmissive area TA. At least part of an end of the first ink layer I1 may overlap the first print layer P1, and may overlap with the blocking area BA.

The second print layer P2 overlaps the blocking area BA of the infrared ray detection area IRA. The first print layer P1 and the second print layer P2 may form a blocking area BA while having a substantially equivalent edge.

The second ink layer I2 may be disposed on the second print layer P2. The second ink layer I2 may be disposed on the first ink layer I1, overlapping the opening OP1. The second ink layer I2 may extend to a side of the second print layer P2 disposed in the blocking area BA. Although it is not illustrated in FIG. 12, as shown in FIG. 7, an alignment mark that is disposed in a same layer as the second ink layer I2 may be disposed in the peripheral area PA.

Referring to FIG. 13 in addition to FIG. 11, the first print layer P1 and the second print layer P2 may be sequentially stacked on a side of the base layer BL. The first print layer P1 and the second print layer P2 overlap the blocking area BA of the infrared ray detection area IRA. The first print layer P1 and the second print layer P2 may include an opening OP2 overlapping the transmissive area TA.

The first ink layer I1 that overlaps the opening OP2 may be disposed on the second print layer P2. The first ink layer I1 may overlap the transmissive area TA. At least part of an end of the first ink layer I1 may overlap the second print layer P2, and may overlap the blocking area BA.

The second ink layer I2 may be disposed on the first ink layer I1. The second ink layer I2 may overlap the opening OP2. The second ink layer I2 may extend to a side of the second print layer P2 disposed in the blocking area BA while completely covering the exposed first ink layer I1. Although it is not illustrated in FIG. 13, as shown in FIG. 8, an alignment mark that is disposed in a same layer as the second ink layer I2 may be disposed in the peripheral area PA.

Referring to Table 1, transmittance in the infrared ray detection area of the window according to the embodiment will be described.

In the 550 nanometer wavelength band, a transmittance in a range of about 0.5% to about 1.2% needs to be satisfied, and transmittance in the above-stated wavelength band were 0.796%, 0.564%, 0.73 4%, 0.528%, and 0.869% respectively with respect to embodiments 1 to 5 in Table 1, which satisfy the above-stated transmittance range.

In the 940 nanometer wavelength band, a transmittance greater than about 40% is expected, and embodiments 1 to 5 respectively had transmittances of 58.487%, 41.224%, 47.603%, 42.859%, and 58.087%, which satisfy the transmittance range.

TABLE 1

| | 550 nanometer wavelength band transmittance (%) | 940 nanometer wavelength band transmittance (%) |
| --- | --- | --- |
| Exemplary Embodiment 1 | 0.796 | 58.487 |
| Exemplary Embodiment 2 | 0.564 | 41.224 |
| Exemplary Embodiment 3 | 0.734 | 47.603 |
| Exemplary Embodiment 4 | 0.528 | 42.859 |
| Exemplary Embodiment 5 | 0.869 | 58.087 |

According to the embodiments, it is possible to provide a display device having a simplified process and structure through an alignment mark and a second ink layer manufactured through the same process while providing predetermined transmittance in an infrared transmitting area.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
    a display element layer disposed on a substrate; and
    a window disposed on the display element layer, the
        window including a display area and a peripheral area,
        wherein
    the window comprises:

a base layer;
a first print layer disposed on a side of the base layer, the first print layer including an opening;
a first ink layer that overlaps the opening, the first ink layer including an infrared ink; and
a second ink layer that overlaps the opening, the second ink layer including a white ink comprising at least one carbon-based compound; and
an alignment mark including the white ink, and
the alignment mark overlaps the peripheral area.

2. The display device of claim 1, wherein the white ink comprises at least one of compounds represented by Chemical Formula 1 to Chemical Formula 4:

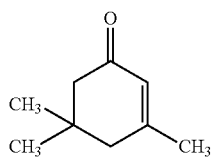

[Chemical Formula 1]

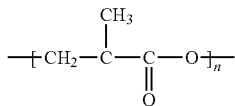

[Chemical Formula 2]

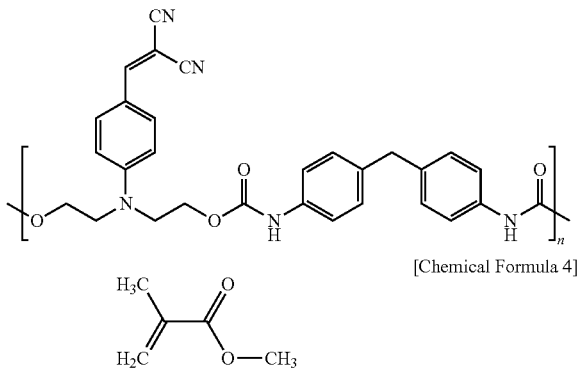

[Chemical Formula 3]

[Chemical Formula 4]

wherein in Chemical Formula 2 and Chemical Formula 3, n is a natural number greater than 1.

3. The display device of claim 2, wherein
the compound represented by Chemical Formula 1 is included in an amount equal to or greater than about 48 wt % with respect to the total content of the white ink,
the compound represented by Chemical Formula 2 is included in an amount equal to or greater than about 44 wt % with respect to the total content of the white ink,
the compound represented by Chemical Formula 4 is included in an amount equal to or greater than about 1 wt % with respect to the total content of the white ink, and
the sum of the compounds represented by Chemical Formula 1, Chemical Formula 2, and Chemical Formula 4 is 100 wt %.

4. The display device of claim 2, wherein
the compound represented by Chemical Formula 1 is included in an amount equal to or greater than about 48 wt % with respect to the total content of the white ink,
the compound represented by Chemical Formula 3 is included in an amount equal to or greater than about 44 wt % with respect to the total content of the white ink,
the compound represented by Chemical Formula 4 is included in an amount equal to or greater than about 1 wt % with respect to the total content of the white ink, and
the sum of the compounds represented by Chemical Formula 1, Chemical Formula 3, and Chemical Formula 4 is 100 wt %.

5. The display device of claim 1, wherein the alignment mark and the second ink layer are disposed on a same layer.

6. The display device of claim 1, wherein the window further comprises a second print layer disposed between the first print layer and the second ink layer.

7. The display device of claim 6, wherein the second print layer is disposed between the first ink layer and the second ink layer.

8. The display device of claim 6, wherein the second print layer is disposed between the first print layer and the first ink layer.

9. The display device of claim 1, further comprising an infrared ray sensor that overlaps the opening.

10. The display device of claim 1, wherein the opening overlaps the peripheral area.

11. The display device of claim 1, wherein the opening overlaps the display area.

12. The display device of claim 1, wherein the opening has a transmittance equal to or greater than about 40% in a wavelength of 940 nanometers.

13. A display device comprising:
a display element layer disposed on a substrate;
a window disposed on the display element layer, the window including an infrared ray detection area; and
an infrared ray sensor that overlaps the infrared ray detection area, wherein
the window comprises:
a base layer;
a print layer disposed on a side of the base layer;
a first ink layer that overlaps at least a part of the print layer, the first ink layer including an infrared ray ink, the first ink layer being disposed in the infrared ray detection area; and
a second ink layer including a white ink comprising at least one carbon-based compound, the second ink layer overlapping the first ink layer; and
an alignment mark including the white ink,
the print layer comprises an opening that overlaps the first ink layer and the second ink layer,
the display device comprises a display area and a peripheral area, and
the alignment mark overlaps the peripheral area.

14. The display device of claim 13, wherein the white ink comprises at least one of compounds represented by Chemical Formula 1 to Chemical Formula 4:

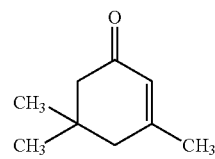

[Chemical Formula 1]

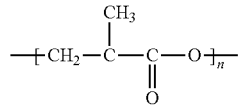

[Chemical Formula 2]

-continued

[Chemical Formula 3]

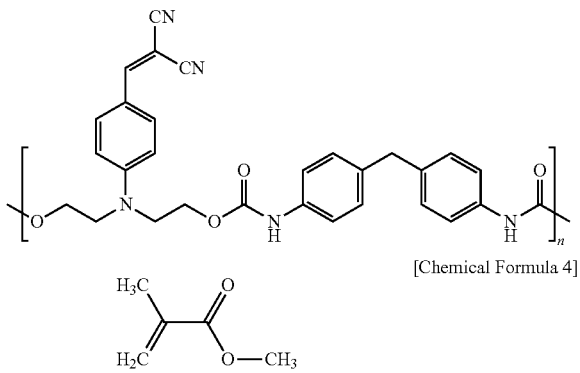

[Chemical Formula 4]

wherein in Chemical Formula 2 and Chemical Formula 3, n is a natural number greater than 1.

15. The display device of claim 14, wherein
the compound represented by Chemical Formula 1 is included in an amount equal to or greater than about 48 wt % with respect to the total content of the white ink,
the compound represented by Chemical Formula 2 is included in an amount equal to or greater than about 44 wt % with respect to the total content of the white ink,
the compound represented by Chemical Formula 4 is included in an amount equal to or greater than about 1 wt % with respect to the total content of the white ink, and
the sum of the compounds represented by Chemical Formula 1, Chemical Formula 2, and Chemical Formula 4 is 100 wt %.

16. The display device of claim 14, wherein
the compound represented by Chemical Formula 1 is included in an amount equal to or greater than about 48 wt % with respect to the total content of the white ink,
the compound represented by Chemical Formula 3 is included in an amount equal to or greater than about 44 wt % with respect to the total content of the white ink,
the compound represented by Chemical Formula 4 is included in an amount equal to or greater than about 1 wt % with respect to the total content of the white ink, and
the sum of the compounds represented by Chemical Formula 1, Chemical Formula 3, and Chemical Formula 4 is 100 wt %.

17. The display device of claim 13, wherein the print layer comprises a first print layer and a second print layer.

* * * * *